(12) United States Patent
Liao et al.

(10) Patent No.: US 11,726,885 B2
(45) Date of Patent: Aug. 15, 2023

(54) EFFICIENT METHOD AND SYSTEM OF INTELLIGENT DEPLOYING FILE LEVEL RESTORE AGENT IN MULTICLOUD

(71) Applicant: EMC IP Holding Company LLC, Hopkinton, MA (US)

(72) Inventors: Mengze Liao, Shanghai (CN); Jing Yu, Shanghai (CN); Ming Zhang, Shanghai (CN); Kunal Ruvala, Mumbai (IN); Yongsheng Guo, Nanjing (CN); Jinru Yan, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 891 days.

(21) Appl. No.: 16/172,549

(22) Filed: Oct. 26, 2018

(65) Prior Publication Data

US 2020/0133796 A1 Apr. 30, 2020

(51) Int. Cl.
*G06F 11/14* (2006.01)

(52) U.S. Cl.
CPC ...... *G06F 11/1469* (2013.01); *G06F 11/1464* (2013.01)

(58) Field of Classification Search
CPC .............. G06F 11/1469; G06F 11/1464
See application file for complete search history.

(56) References Cited

U.S. PATENT DOCUMENTS

| | | | | |
|---|---|---|---|---|
| 10,691,750 | B1* | 6/2020 | Karppanen | G06F 16/9574 |
| 2012/0117029 | A1* | 5/2012 | Gold | G06F 11/1451 |
| | | | | 707/651 |
| 2012/0159232 | A1* | 6/2012 | Shimada | G06F 11/2028 |
| | | | | 714/3 |
| 2018/0039519 | A1* | 2/2018 | Kumar | G06F 9/4812 |

* cited by examiner

*Primary Examiner* — Apu M Mofiz
*Assistant Examiner* — Husam Turki Samara
(74) *Attorney, Agent, or Firm* — Womble Bond Dickinson (US) LLP

(57) ABSTRACT

A method, apparatus, and system for managing file level restore agents is provided. The operations comprising: determining a computing resource usage level at a data protection appliance; determining whether the computing resource usage level at the data protection appliance is below a first threshold; in response to determining that the computing resource usage level at the data protection appliance is below a first threshold, assigning a new file level restore-associated job to a first tier file level restore agent for performance; and in response to determining that the computing resource usage level at the data protection appliance is not below a first threshold, assigning the new file level restore-associated job to a second tier file level restore agent for performance.

20 Claims, 9 Drawing Sheets

US 11,726,885 B2

EFFICIENT METHOD AND SYSTEM OF INTELLIGENT DEPLOYING FILE LEVEL RESTORE AGENT IN MULTICLOUD

FIELD OF THE INVENTION

Embodiments of the present invention relate generally to data storage systems. More particularly, embodiments of the invention relate to performing file level restore.

BACKGROUND

The user experience associated with the file level restore (FLR) may deteriorate when the restore destination and the data backup appliance are connected through a slower network connection (e.g., the public Internet instead of a private high-speed network). For example, the response time may become longer, and the user may experience difficulty browsing the files.

The slower network connection may be unavoidable in certain situations. Examples may include hyper-convergence infrastructure, a connection between a private cloud and a public cloud (i.e., hybrid cloud), a connection between different regions of a public cloud, or a connection between different public clouds (e.g., between an Amazon Web Service "AWS" cloud and a Microsoft Azure cloud).

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

A method, apparatus, and system for managing file level restore agents is provided. The operations comprising: determining a computing resource usage level at a data protection appliance; determining whether the computing resource usage level at the data protection appliance is below a first threshold; in response to determining that the computing resource usage level at the data protection appliance is below a first threshold, assigning a new file level restore-associated job to a first tier file level restore agent for performance; and in response to determining that the computing resource usage level at the data protection appliance is not below a first threshold, assigning the new file level restore-associated job to a second tier file level restore agent for performance.

Figure 1:
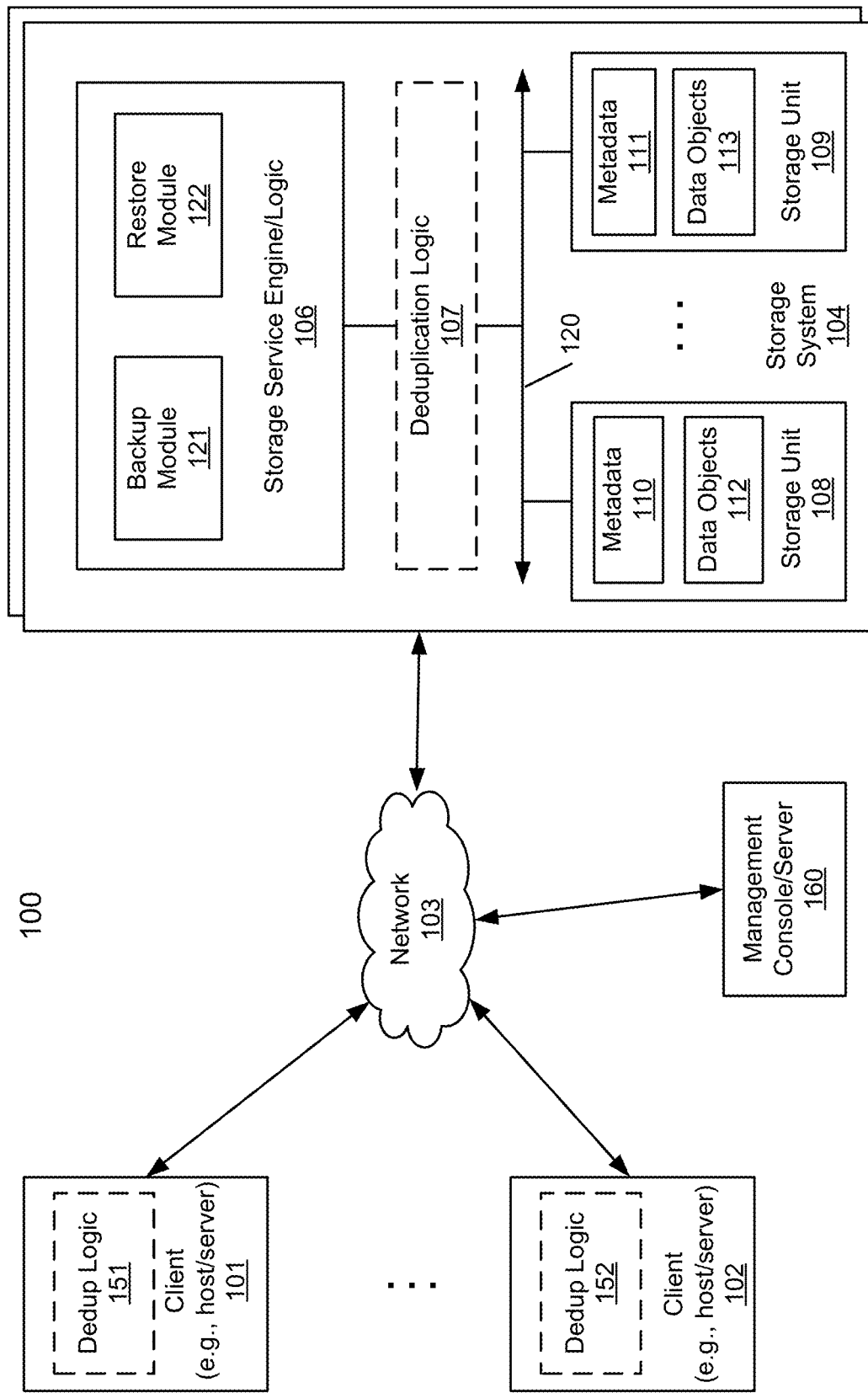
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, storage system 104 further includes a storage manager or storage controller (not shown) configured to manage storage resources of storage system 104, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or RDFS) to a client based on a storage policy or service level agreement associated with that particular client as part of software-defined storage services.

Figure 2:
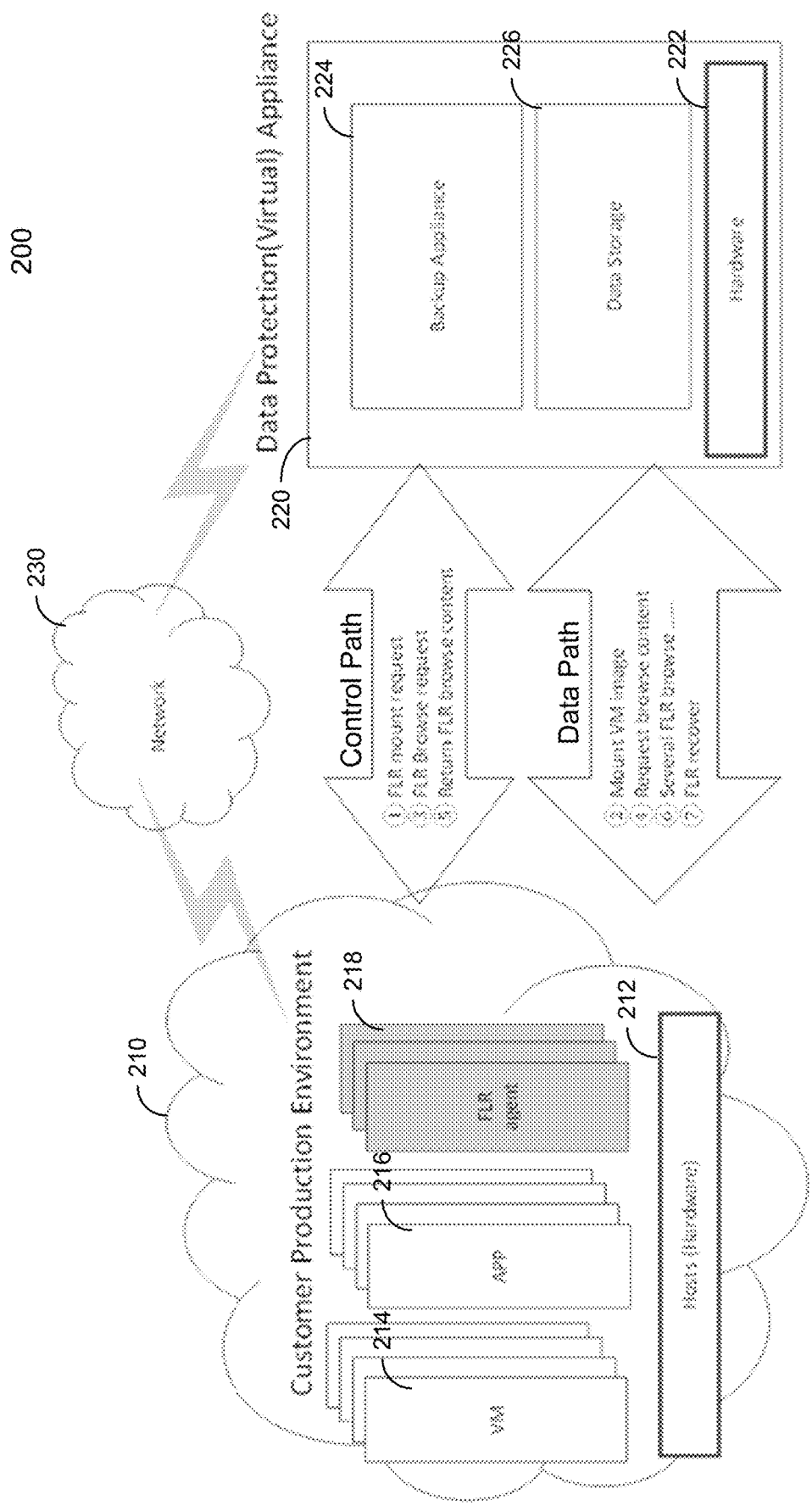
FIG. 2 is a block diagram illustrating a prior art implementation of an environment for the file level restore.

Referring to FIG. 2, a block diagram 200 illustrating a prior art implementation of an environment for the file level restore is shown. A customer production environment 210 and a data protection appliance (which may be virtualized) 220 is connected through a network 230. The customer production environment 210 comprises one or more virtual machines (VMs) 214, one or more production applications (APPs) 216, and/or one or more file level restore agents 218, executed on underlying hardware 212. Furthermore, the data protection appliance 220 comprises a backup appliance 224 that manages data backup and a data storage 226 where backed up data is stored, residing on underlying hardware 222. As the file level restore agents 218 are on one side of the network 230, and the backup appliance 224 and the data storage 226 are on the other side, all transmissions for the file level restore along both the control path and the data path need to cross the network 230.

It should be appreciated that the file level restore may comprise the following network transmissions: 1) a file level restore mount request (control path) is sent between the file level restore agent and the backup appliance to start up a mount operation; 2) the data for mounting a virtual machine (VM) image is transmitted (data path); 3) a file level restore browse request (control path) is sent between the file level restore agent and the backup appliance to enable browsing of the folder specified in request; 4) the file level restore agent retrieves the data of the mounted virtual machine image from data storage 226 to obtain a file list of the specified folder (data path); 5) the file level restore agent returns the file list to the backup appliance and further to a user console (control path); 6) additional browse requests and browse content are transmitted between the file level restore agent and the backup appliance before the user decides on the files to be restored; accordingly, steps 5-7 are repeated as necessary; 7) the user-selected files are restored: the file content is transmitted from data storage 226 to the file level restore agent and finally to VMs 214 or APPs 216 to complete the file restore (data path).

The prior art implementation illustrated in FIG. 2 is associated with a number of disadvantages. First of all, since the file level restore agent is executed on top of the customer hardware, the file level restore process consumes the customer's processor and memory resources. Further, even though the file level restore browse operations do not read or write any customer data, they still consume network resources between the customer environment and the data protection appliance. The network delay (which can be severe if, e.g., the customer environment and the data protection appliance are separated by a long geographical distance) can make file level restore browse operations inefficient, especially when these operations are performed with any frequency. Moreover, significant costs may be incurred by file level restore-associated operations as a result of the network traffic if the customer environment and the data protection appliance are hosted by different cloud providers.

Another conventional implementation involves deploying a centralized mount server close to the backup data storage. Such an implementation is also less than ideal for a number of reasons. Additional hardware and therefore additional costs are required if the mount server is a standalone server. The hardware resources can be underutilized when there is no file level restore-associated operation. On the other hand, if the mount server is implemented as a virtualized server hosted on top the same hardware that hosts the data protection appliance, it may compete with the data protection appliance for processor and memory resources during file level restore operations. Moreover, as the mount server is centralized, scalability is poor, as the resource consumption can grow exponentially when a large number of file level restore sessions are executed (e.g., by different customers). Accordingly, concurrent backup and/or restore tasks may be negatively affected.

Figure 3:
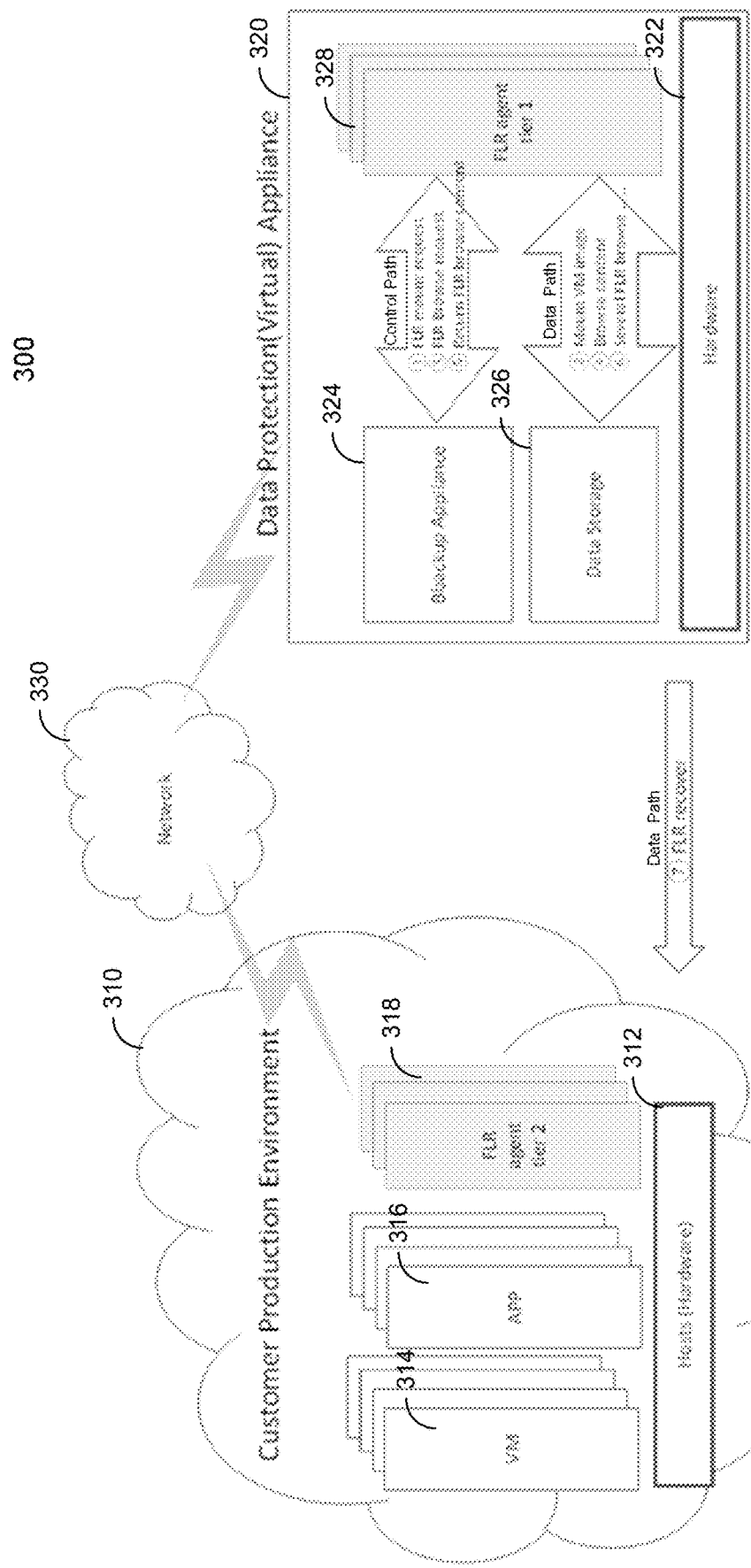
FIG. 3 is a block diagram illustrating an environment for the file level restore according to one embodiment.

Referring to FIG. 3, a block diagram 300 illustrating an environment for the file level restore according to one embodiment is shown. A customer production environment 310 and a data protection appliance (which may be virtualized) 320 is connected through a network 330. The customer production environment 310 comprises one or more virtual machines (VMs) 314, one or more production applications (APPs) 316, and/or one or more second tier file level restore agents 318, executed on underlying hardware 312. Furthermore, the data protection appliance 320 comprises a backup appliance 324 that manages data backup and a data storage 326 where backed up data is stored, residing on underlying hardware 322. In addition, in contrast to the prior art implementation illustrated in FIG. 2, the data protection appliance 320 of FIG. 3 further comprises one or more first tier file level restore agents 328.

The second tier file level restore agents 318 in FIG. 3 may be similar to the file level restore agents 218 illustrated in FIG. 2. However, as will be described in further detail below, the second tier file level restore agents 318 are not used for file level restore-associated operations when sufficient computing resources (e.g., processor and memory) are available at the data protection appliance 320. Under such circumstances, the first tier file level restore agents 328 are used for these operations. Because both the control path and the data path for file level restore-associated operations other than the file restoration itself are contained within the data protection appliance 320, the operations are not affected by the network delay associated with the network 330. Moreover, no inter-cloud traffic is incurred. Therefore, the user experience may be improved, especially when the user needs to perform a large number of file level restore browse operations. Only when a file is actually selected for restoration by the user, is the data for the file to be restored transmitted across the network 330 from the data protection appliance 320 to the customer production environment 310. Furthermore, the second tier file level restore agents 318 executed within the customer production environment 310 are used only when insufficient computing resources are available at the data protection appliance 320. Therefore, most, if not all, of the disadvantages associated with the prior art implementation illustrated in FIG. 2 can be avoided.

In one embodiment, first tier file level restore agents 328 may be disabled during certain predetermined time periods. This may be useful when it is known in advance that backup and/or restore jobs are scheduled to be performed during these reserved time periods.

Figure 4A:
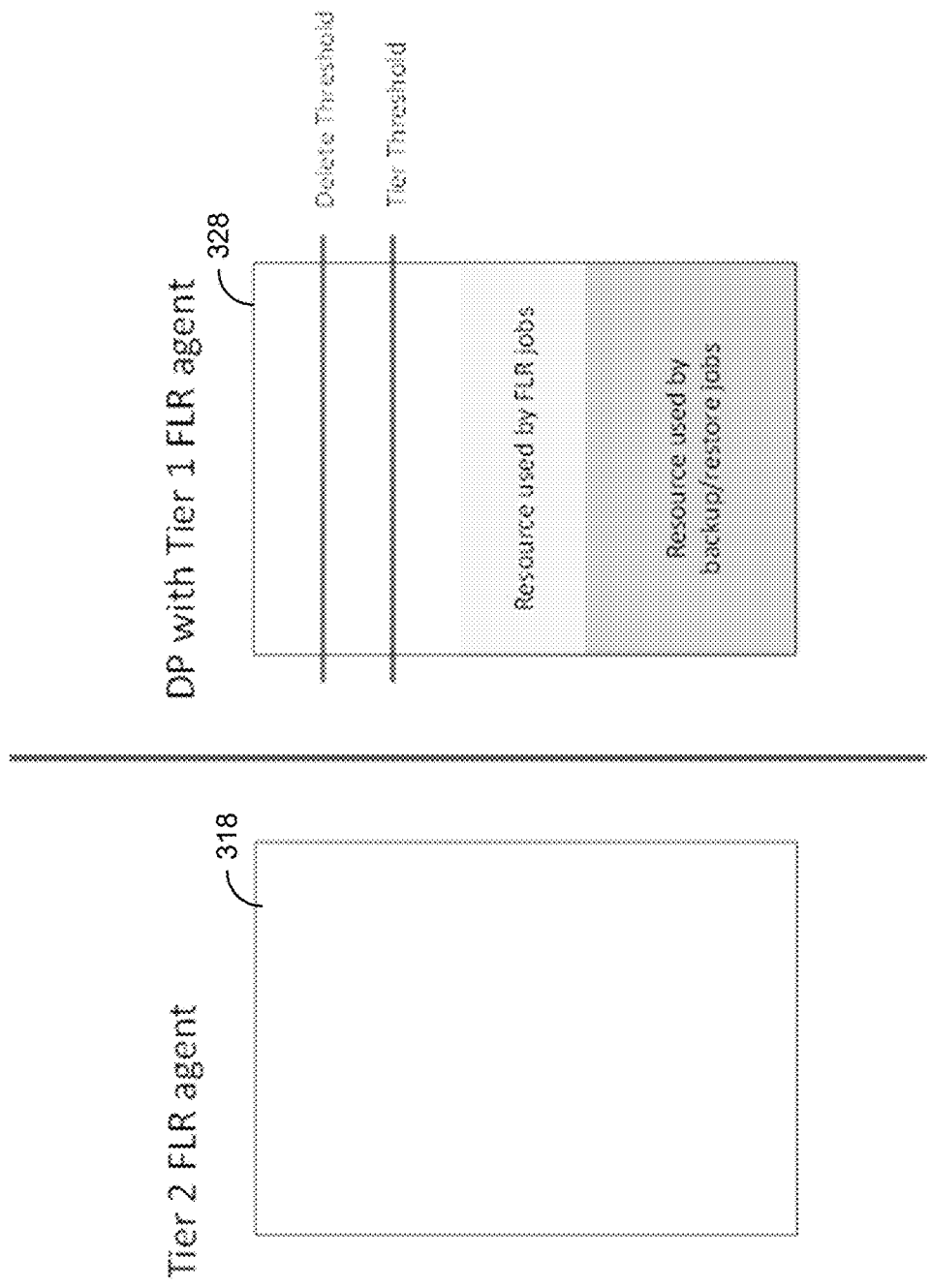
FIGS. 4A-D are diagrams illustrating a method for allocating file level restore-associated jobs between the first tier file level restore agents and the second tier file level restore agents according to one embodiment.

Referring to FIGS. 4A-D, diagrams 400A-D illustrating a method for allocating file level restore-associated jobs between the first tier file level restore agents and the second tier file level restore agents according to one embodiment are shown. FIG. 4A illustrates a scenario where the computing resources in use at the data protection appliance (by both backup/restore jobs and file level restore-associated jobs) are below a first threshold (tier threshold). Under this scenario, a new file level restore-associated job will be assigned to the first tier file level restore agents 328.

Figure 4B:
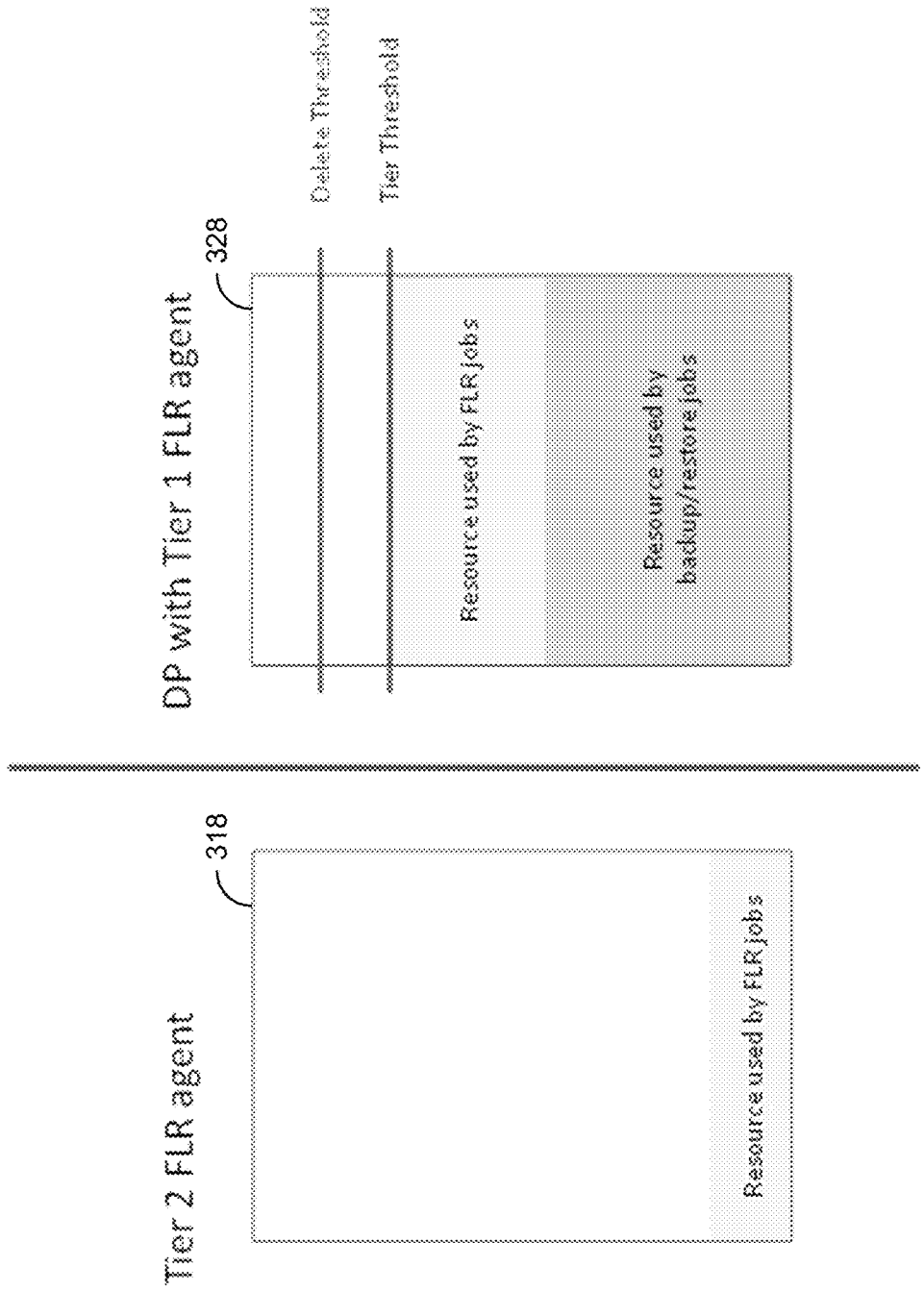
Figure 4C:
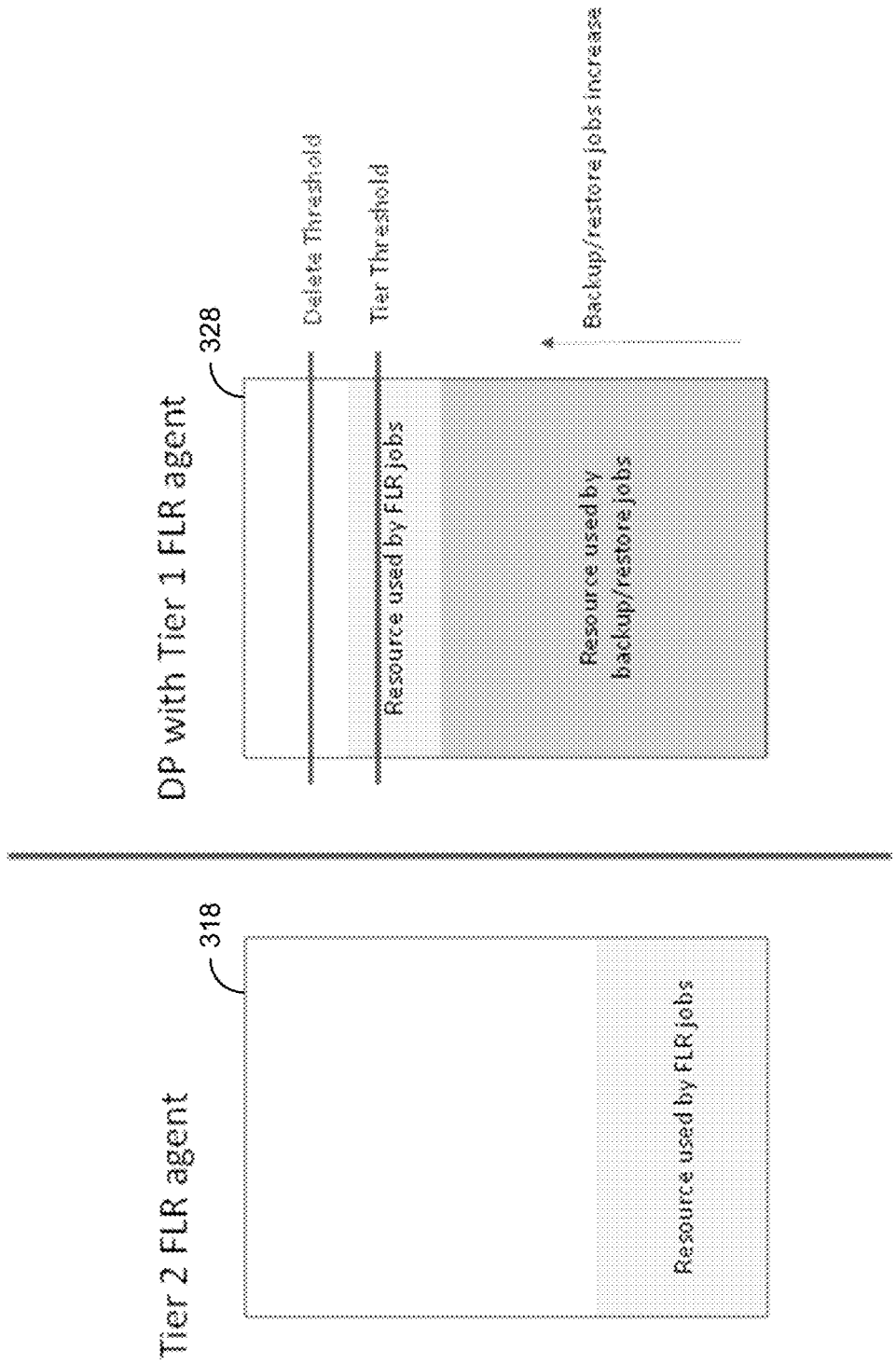

FIGS. 4B and 4C illustrate scenarios where the computing resources in use at the data protection appliance (by both backup/restore jobs and file level restore-associated jobs) are at or above the first threshold (tier threshold) (e.g., due to an increase in resource usage by backup/restore jobs), but below a second threshold (delete threshold). Under these scenarios, a new file level restore-associated job will be assigned to the second tier file level restore agents 318. However, existing file level restore-associated jobs that are being handled by the first tier file level restore agents 328 are allowed to continue with the first tier file level restore agents 328.

Figure 4D:
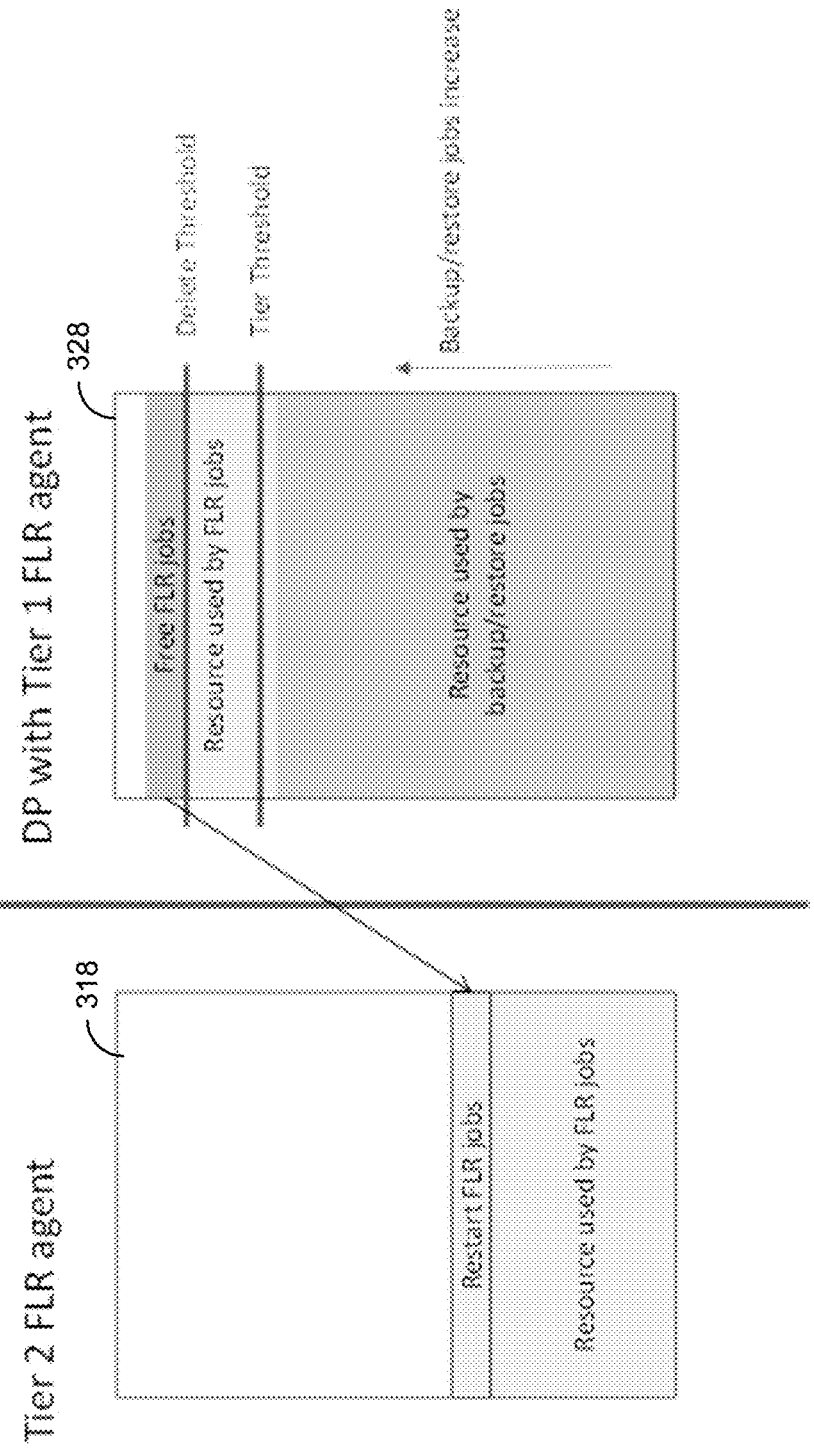

FIG. 4D illustrates a scenario where the computing resources in use at the data protection appliance (by both backup/restore jobs and file level restore-associated jobs) are above the second threshold (delete threshold). Under this scenario, a new file level restore-associated job will be assigned to the second tier file level restore agents 318. Moreover, existing file level restore-associated jobs that are being handled by the first tier file level restore agents 328 will be moved to the second tier file level restore agents 318 (i.e., vacated from the first tier file level restore agents 328 and restarted at the second tier file level restore agents 318) until the computing resources in use at the data protection appliance are below the second threshold (delete threshold).

Figure 5:
FIG. 5 is a flow diagram illustrating a process for managing file level restore agents according to one embodiment.

FIG. 5 is a flow diagram illustrating a process 500 for managing file level restore agents according to one embodiment. Process 500 may be performed by processing logic that includes hardware (e.g. circuitry, dedicated logic, etc.), software (e.g., embodied on a non-transitory computer readable medium), or a combination thereof. For example, process 500 may be performed by processor(s) 1505 of FIG. 6. Referring to FIG. 5, at block 510, a computing resources usage level at a data protection appliance may be determined. At block 520, whether a present time corresponds to a predetermined time period reserved for backup/restore jobs at the data protection appliance is determined. If yes at block 520, the process proceeds to block 560, and a new file level restore-associated job is assigned to a second tier file level restore agent for performance. If no at block 520, the process proceeds to block 530. At block 530, whether the computing resource usage level at the data protection appliance is below a first threshold (tier threshold) is determined. If yes at block 530, the process proceeds to block 570, and a new file level restore-associated job is assigned to a first tier file level restore agent for performance. If no at block 530, the process proceeds to block 540.

At block 540, whether the computing resource usage level at the data protection appliance is below a second threshold (delete threshold) is determined. If yes at block 540, the process proceeds to block 560, and the new file level restore-associated job is assigned to the second tier file level restore agent for performance. If no at block 540, the process proceeds to block 550. At block 550, one or more file level restore-associated jobs may be vacated from the first tier file level restore agent, and restarted at the second tier file level restore agent. After vacation of the one or more file level restore-associated jobs from the first tier file level restore agent, the computing resource usage level at the data protection appliance may be below the second threshold. After block 550 is completed, at block 560, the new file level restore-associated job is assigned to the second tier file level restore agent for performance.

It should be appreciated that the operations of blocks 540 and 550 may be performed from time to time or periodically irrespective of whether a request for a new file level restore-associated job is received.

In one embodiment, the computing resources usage level at a data protection appliance may comprise a processor usage level, a memory usage level, or a combination thereof. The new file level restore-associated job may be a file level restore browse request. The first tier file level restore agent may be executed at the data protection appliance. The second tier file level restore agent may be executed in a client environment. The client environment and the data protection appliance may be connected over a public network. The client environment and the data protection appliance may be hosted by different cloud providers, or may be located in different geographical regions.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
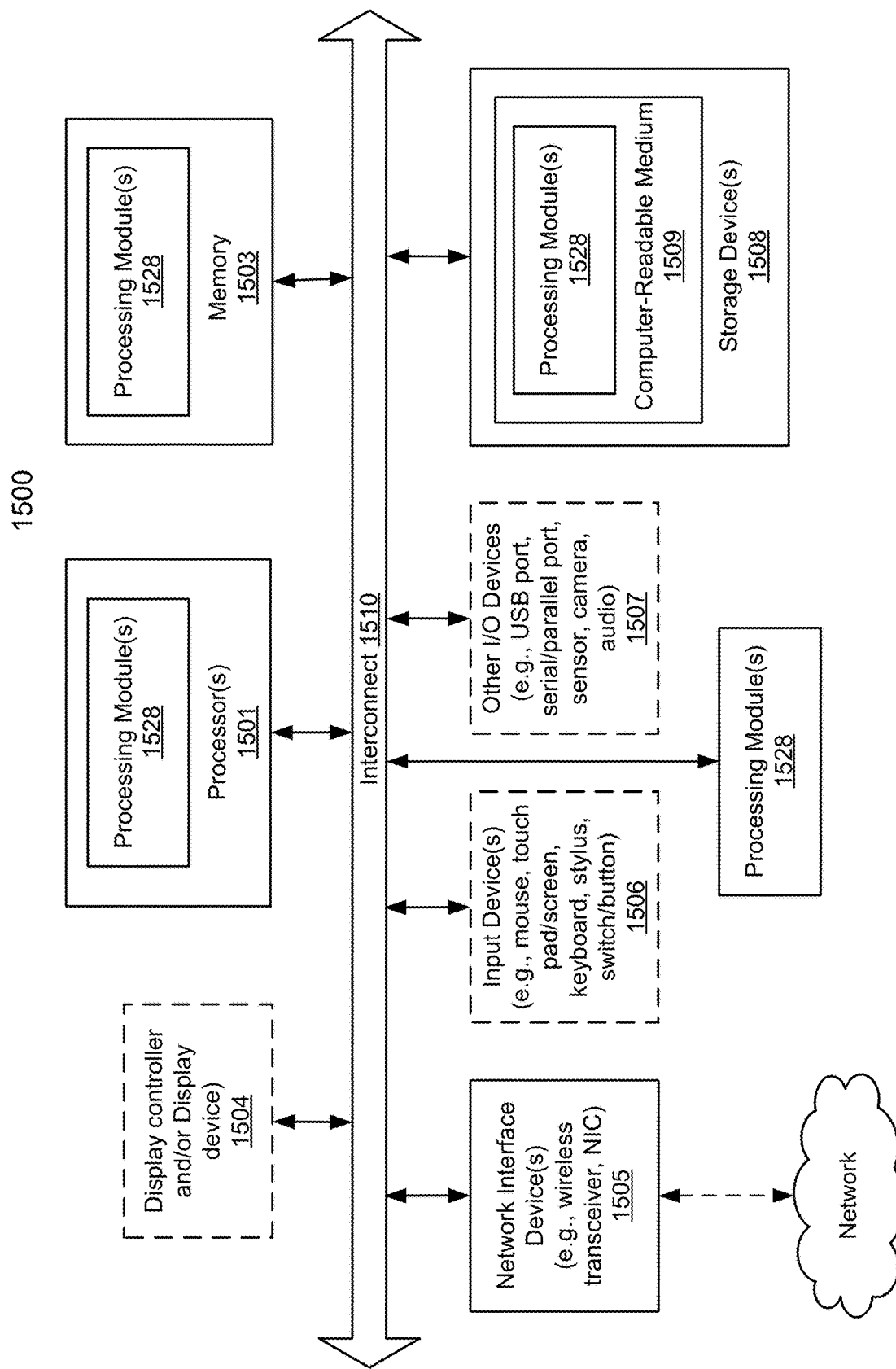
FIG. 6 is a block diagram illustrating a data processing system according to one embodiment.

FIG. 6 is a block diagram illustrating an example of a data processing system which may be used with one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, a storage service logic, a deduplication engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for allocating file level restore-associated jobs between different tiers of file level restore agents, comprising:

receiving, by a data protection appliance from a client environment, a first request for performing a first file level restore-associated job, wherein the client environment and the data protection appliance are hosted by different cloud providers, and are connected by a public network, wherein the data protection appliance includes a primary tier file level restore agent executing thereon, and the client environment includes a secondary tier file level restore agents executing thereon, wherein the first file level restore-associated job includes at least a browse portion and a data transmission portion, wherein the browse portion comprises one or more browse operations performed through the client environment for selecting a file that has been stored to the data protection appliance via a deduplication process, and wherein the data transmission portion comprises a data transmission operation for transmitting the file from the data protection appliance to the client environment over the public network;

determining, by the data protection appliance, whether a computing resource usage level of the data protection appliance has reached a first level below a first threshold;

in response to determining that the computing resource usage level of the data protection appliance is at the first level, assigning, by the data protection appliance, the browse portion of the first file level restore-associated job to the primary tier file level restore agent;

determining, by the data protection appliance, that the computing resource usage level has reached a second level between the first threshold and a second threshold;

receiving, at the data protection appliance, a second request for performing a second file level restore-associated job while the computing resource usage level is at the second level;

assigning, by the data protection appliance, a browse portion of the second file level restore-associated job to the secondary tier file level restore agent, while allowing the browse portion of the first file level restore-associated job to continue executing on the primary tier file level restore agent;

determining, by the data protection appliance, that the computing resource usage level has reached a third level above the second threshold;

receiving, at the data protection appliance, a third request for performing a third file level restore-associated job while the computing resource usage level is at the third level, and wherein the browse portion of the first file level restore-associated job is still ongoing;

assigning, by the data protection appliance, a browse portion of the third file level restore-associated job to the secondary tier file level restore agent, and moving the browse portion of the first file level restore-associated job to the secondary tier file level restore agent.

2. The method of claim 1, further comprising:

in response to determining that a present time corresponds to a reserved time period, assigning a second file level restore-associated job to a second tier file level restore agent executing in the client environment.

3. The method of claim 2, wherein each of the first file level restore-associated job and the second file level restore-associated job is a file level restore browse request.

4. The method of claim 1, wherein the data protection appliance and the client environment are hosted by different cloud providers or in different geographical regions.

5. A non-transitory machine-readable medium having instructions stored therein, which when executed by a processor of a data protection appliance, cause the data protection appliance to perform operations for managing file level restore agents, the operations comprising:

receiving, from a client environment, a request for performing a first file level restore-associated job, wherein the client environment and the data protection appliance are hosted by different cloud providers, and are connected by a public network, wherein the data protection appliance includes a primary tier file level restore agent executing thereon, and the client environment includes a secondary tier file level restore agents executing thereon, wherein the first file level restore-associated job includes one or more browse operations performed through the client environment for selecting a file that was stored to the data protection appliance via a deduplication process, and wherein a data transmission portion comprises a data transmission operation for transmitting the file from the data protection appliance to the client environment over the public network;

determining whether a computing resource usage level of the data protection appliance has reached a first level below a first threshold;

in response to determining that the computing resource usage level of the data protection appliance is the first level, assigning a browse portion of the first file level restore-associated job to the primary tier file level restore agent;

determining, by the data protection appliance, that the computing resource usage level has reached a second level between the first threshold and a second threshold;

receiving, at the data protection appliance, a second request for performing a second file level restore-associated job while the computing resource usage level is at the second level;

assigning, by the data protection appliance, a browse portion of the second file level restore-associated job to the secondary tier file level restore agent, while allowing the browse portion of the first file level restore-associated job to continue executing on the primary tier file level restore agent;

determining, by the data protection appliance, that the computing resource usage level has reached a third level above the second threshold;

receiving, at the data protection appliance, a third request for performing a third file level restore-associated job while the computing resource usage level is at the third level, and wherein the browse portion of the first file level restore-associated job is still ongoing;

assigning, by the data protection appliance, a browse portion of the third file level restore-associated job to the secondary tier file level restore agent, and moving the browse portion of the first file level restore-associated job to the secondary tier file level restore agent.

6. The non-transitory machine-readable medium of claim 5, the operations further comprising:

in response to determining that a present time corresponds to a reserved time period, assigning a second file level restore-associated job to a second tier file level restore agent executing in the client environment.

7. The non-transitory machine-readable medium of claim 6, wherein each of the first file level restore-associated job and the second file level restore-associated job is a file level restore browse request.

8. The non-transitory machine-readable medium of claim 5, wherein the data protection appliance and the client environment are hosted by different cloud providers or in different geographical regions.

9. A data processing system operating as a data protection appliance, comprising:
- a processor; and
- a memory coupled to the processor to store instructions, which when executed by the processor, cause the processor to perform operations for managing file level restore agents, the operations including:
  - receiving, from a client environment, a request for performing a first file level restore-associated job, wherein the client environment and the data protection appliance are hosted by different cloud providers, and are connected by a public network, wherein the data protection appliance includes a primary tier file level restore agent executing thereon, and the client environment includes a secondary tier file level restore agents executing thereon, wherein the first file level restore-associated job includes one or more browse operations performed through the client environment for selecting a file that was stored to the data protection appliance via a deduplication process, and wherein a data transmission portion comprises a data transmission operation for transmitting the file from the data protection appliance to the client environment over the public network;
  - determining whether a computing resource usage level of the data protection appliance has reached a first level below a first threshold;
  - in response to determining that the computing resource usage level of the data protection appliance is the first level, assigning a browse portion of the first file level restore-associated job to the primary tier file level restore agent;
  - determining, by the data protection appliance, that the computing resource usage level has reached a second level between the first threshold and a second threshold;
  - receiving, at the data protection appliance, a second request for performing a second file level restore-associated job while the computing resource usage level is at the second level;
  - assigning, by the data protection appliance, a browse portion of the second file level restore-associated job to the secondary tier file level restore agent, while allowing the browse portion of the first file level restore-associated job to continue executing on the primary tier file level restore agent;
  - determining, by the data protection appliance, that the computing resource usage level has reached a third level above the second threshold;
  - receiving, at the data protection appliance, a third request for performing a third file level restore-associated job while the computing resource usage level is at the third level, and wherein the browse portion of the first file level restore-associated job is still ongoing;
  - assigning, by the data protection appliance, a browse portion of the third file level restore-associated job to the secondary tier file level restore agent, and moving the browse portion of the first file level restore-associated job to the secondary tier file level restore agent.

10. The data processing system of claim 9, the operations further comprising:
- in response to determining that a present time corresponds to a reserved time period, assigning a second file level restore-associated job to a second tier file level restore agent executing in the client environment.

11. The data processing system of claim 10, wherein each of the first file level restore-associated job and the second file level restore-associated job is a file level restore browse request.

12. The data processing system of claim 9, wherein the data protection appliance and the client environment are hosted by different cloud providers or in different geographical regions.

13. The computer-implemented method of claim 1, wherein the first file level restore agent retrieves data of a mounted virtual machine image from a data storage to return a list of one or more files.

14. The non-transitory machine-readable medium of claim 5, wherein the first file level restore agent retrieves data of a mounted virtual machine image from a data storage to return a list of one or more files.

15. The data processing system of claim 9, wherein the first file level restore agent retrieves data of a mounted virtual machine image from a data storage to return a list of one or more files.

16. The method of claim 1, wherein the browse portion of each of the first file level restore-associated job, the second file level restore-associated job, and the third file level restore-associated job does not read or write any customer data, but consumes network resources between the client environment and the data protection appliance.

17. The method of claim 1, wherein the browse portion of each of the first file level restore-associated job is performed to determine which file from a plurality of files is to be restored.

18. The non-transitory machine-readable medium of claim 5, wherein the browse portion of each of the first file level restore-associated job, the second file level restore-associated job, and the third file level restore-associated job does not read or write any customer data, but consumes network resources between the client environment and the data protection appliance.

19. The non-transitory machine-readable medium of claim 5, wherein the browse portion of each of the first file level restore-associated job is performed to determine which file from a plurality of files is to be restored.

20. The data process system of claim 9, wherein the browse portion of each of the first file level restore-associated job, the second file level restore-associated job, and the third file level restore-associated job does not read or write any customer data, but consumes network resources between the client environment and the data protection appliance.

* * * * *